United States Patent
Foehr et al.

(10) Patent No.: US 7,478,325 B2
(45) Date of Patent: Jan. 13, 2009

(54) METHODS FOR PROVIDING AN ACCURATE VISUAL RENDITION OF A TEXT ELEMENT FORMATTED WITH AN UNAVAILABLE FONT

(75) Inventors: Oliver H. Foehr, Mercer Island, WA (US); Jerry Dunietz, Seattle, WA (US); Mikhail V. Leonov, Seattle, WA (US); David C. Brown, Redmond, WA (US); Simon Daniels, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 11/112,845

(22) Filed: Apr. 22, 2005

(65) Prior Publication Data

US 2006/0238787 A1    Oct. 26, 2006

(51) Int. Cl.
*G06F 17/21* (2006.01)
(52) U.S. Cl. ................. 715/269; 715/243; 715/248
(58) Field of Classification Search ............... 715/500, 715/517, 522, 523, 527, 542, 200, 243, 248, 715/257, 269, 274
See application file for complete search history.

(56) References Cited

U.S. PATENT DOCUMENTS

| | | | |
|---|---|---|---|
| 5,586,242 A * | 12/1996 | McQueen et al. | 345/467 |
| 5,664,086 A | 9/1997 | Brock et al. | |
| 6,480,291 B1 * | 11/2002 | Daniels et al. | 358/1.11 |
| 6,552,728 B1 * | 4/2003 | Moore et al. | 345/471 |
| 6,675,357 B1 * | 1/2004 | Carter et al. | 715/210 |
| 6,678,410 B1 * | 1/2004 | Phinney et al. | 382/181 |
| 6,718,519 B1 * | 4/2004 | Taieb | 715/269 |
| 6,760,029 B1 * | 7/2004 | Phinney et al. | 345/471 |
| 6,853,980 B1 * | 2/2005 | Ying et al. | 705/27 |
| 7,197,706 B1 * | 3/2007 | Berson et al. | 715/542 |
| 2002/0159084 A1 * | 10/2002 | Daniels et al. | 358/1.11 |
| 2003/0174135 A1 * | 9/2003 | Gyllenskog et al. | 345/471 |
| 2005/0094173 A1 * | 5/2005 | Engelman et al. | 358/1.11 |
| 2006/0017946 A1 * | 1/2006 | Peiro et al. | 358/1.11 |
| 2006/0095836 A1 * | 5/2006 | Ono et al. | 715/513 |
| 2006/0168356 A1 * | 7/2006 | Mairs et al. | 710/1 |
| 2006/0218168 A1 * | 9/2006 | Na et al. | 707/101 |

OTHER PUBLICATIONS

Wikipedia encyclopedia definiton from the Internet, accessed by the examiner on Sep. 30, 2007, 3 pages.*

* cited by examiner

*Primary Examiner*—Stephen S Hong
*Assistant Examiner*—Gregory J Vaughn
(74) *Attorney, Agent, or Firm*—Lee & Hayes, PLLC (57) ABSTRACT

Methods and systems permit rendering a text element formatted using unavailable or restricted fonts. In one embodiment, when producing a document that contains a restricted font, text portions formatted with the restricted font are processed into an alternate representation. A textual representation for the text portions and the additional representation(s) are embedded in a document or container. A unique representation for the restricted font file allows a consuming computing system to attempt to find the restricted font locally. Each textual representation is rendered using its corresponding restricted font, if the restricted font file is found. Otherwise, the additional representation(s) are used.

10 Claims, 4 Drawing Sheets

METHODS FOR PROVIDING AN ACCURATE VISUAL RENDITION OF A TEXT ELEMENT FORMATTED WITH AN UNAVAILABLE FONT

TECHNICAL FIELD

This invention relates to methods and systems for providing an accurate visual rendition of text elements.

BACKGROUND

Font types can include types created by companies known as font foundries. While some foundries allow fonts they have created to be freely distributed or at least to be embedded in documents that are created using the fonts, other foundries restrict what can and cannot be done with a particular font. Generally speaking, there are different levels of restriction that loosely define what one can and cannot do with a particular font. On one level, a font can be completely unrestricted, meaning that one can install it on a client system, distribute it to others for installation, and the like. However, on other levels, there may be various types of restrictions. For example, there are some fonts that carry with them a restriction that they can only be installed on the user's client system if the user is the customer who bought an associated license. In some instances, further restrictions may allow the font to be used for printing, but may not allow the font to be used for anything else, such as doing a print preview. In other instances, embedding the font file associated with a font in a document may be restricted altogether.

These types of restrictions, and others, can greatly inhibit production of a particular document that contains restricted fonts.

Accordingly, this invention arose out of concerns associated with providing systems and methods that enhance production and consumption of documents in view of restricted fonts.

SUMMARY

In at least one embodiment, innovative methods and techniques are described for providing an accurate visual rendition of a text element formatted with an unavailable font. When producing a document that contains one or more restricted fonts, e.g. fonts which cannot be embedded in a document or document container, the font files are not embedded in the document, but rather text portions formatted using a restricted font are converted into an alternate representation. A textual representation for each of the text portions formatted using a restricted font and one or more additional representations are embedded in a document or a document container. A unique set of identifying characteristics for each restricted font file is associated with the textual representation of a text element, thus allowing a computing system rendering or otherwise consuming the document to attempt to find the restricted font(s) locally. Each textual representation can be rendered into text using its corresponding restricted font, if the restricted font file is available to the computing system. Alternately, if the restricted font is not available to the computing system, one of the additional representations for that portion of text can be rendered. In this way, an accurate visual rendition of a document containing one or more portions having a restricted font can be made available.

DETAILED DESCRIPTION

Overview

Various embodiments describe and illustrate methods and systems for providing an accurate rendition of a portion of text in a document or document container. A means of identifying a font file associated with the portion of text is described. In one embodiment, this means comprises a unique set of identifying characteristics for a font file. This unique set of identifying characteristics may or may not be included in an association comprising a textual representation of a portion of text which can be rendered using the font file, and one or more additional representations of the text portion, as will become apparent below.

In one embodiment, a method attempts to render or otherwise display a portion of text comprising part of a document or document container. If a font file associated with the portion of text is not embedded in the document or document container, the method attempts to locate a copy of the non-embedded font file locally using, in at least some embodiments, the font file's unique set of identifying characteristics. In one embodiment, the unique set of identifying characteristics is used to locate any identically-named font files locally, and then determine whether any such files, if found, are identical in content to the non-embedded font file. If a copy of the font file is available locally on the system, a textual representation of the text portion can be rendered using the found font file. If, on the other hand, a copy of the font file is not available, an alternative or additional representation of the text portion (such as one found in the association mentioned above) can be rendered without utilizing the font file.

Exemplary Computer System

Figure 1:
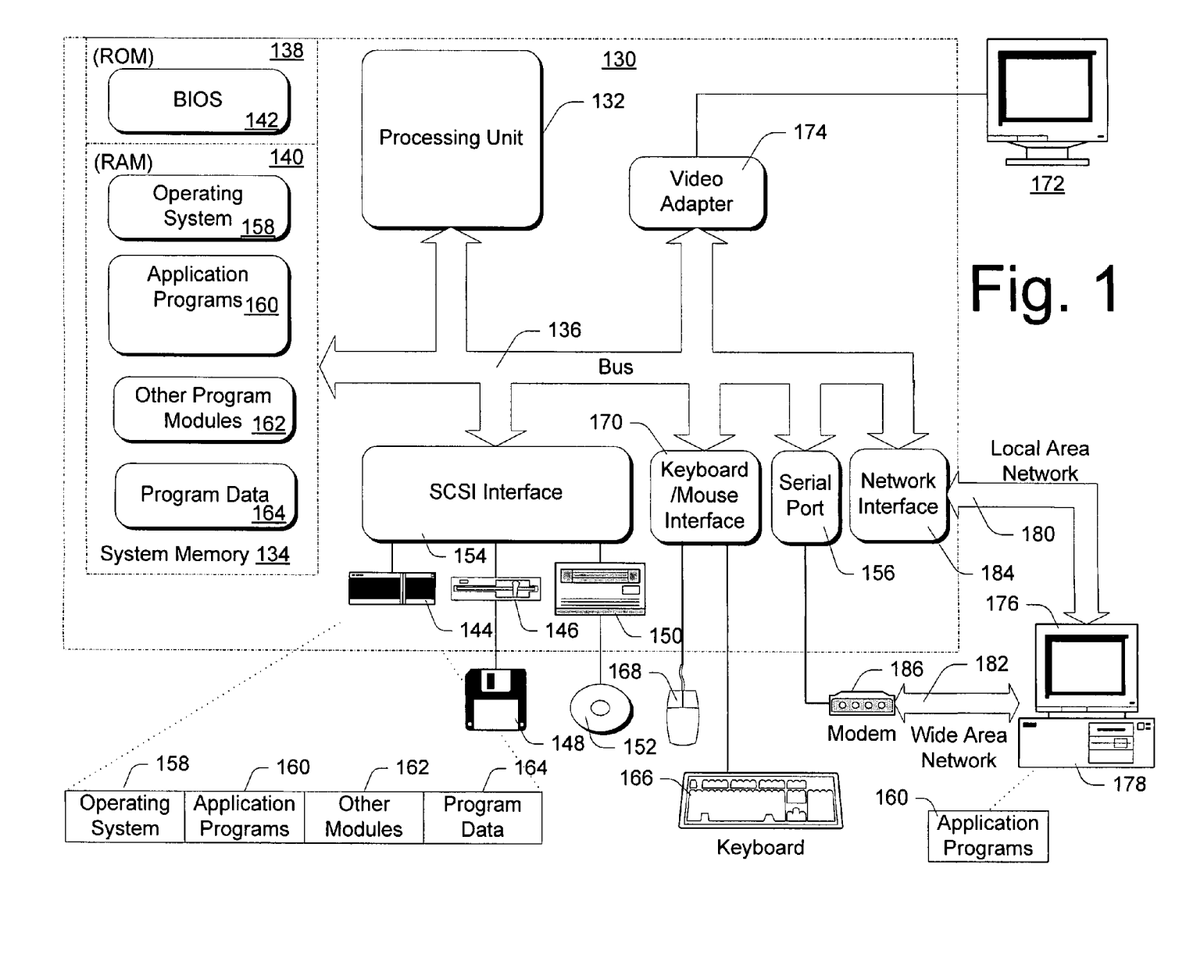
FIG. 1 is a diagram of a computing system that can be used to implement various aspects of various embodiments.

FIG. 1 shows an exemplary computer system having components that can be used to implement one or more of the embodiments described below.

Computer system 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Uniquely Identifying a Font File

Figure 2:
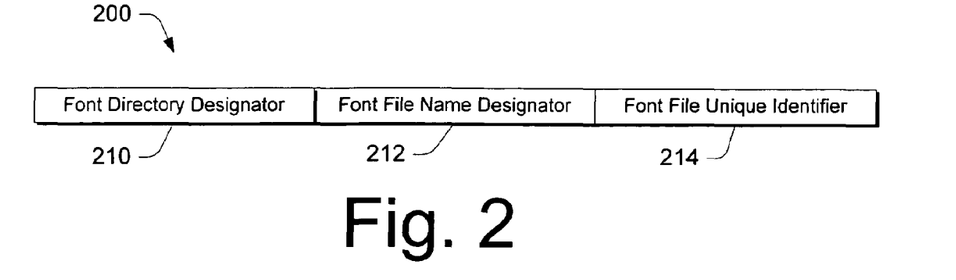
FIG. 2 illustrates an exemplary unique set of identifying characteristics for a font file in accordance with one embodiment.

FIG. 2 illustrates, generally at 200, an exemplary unique set of identifying characteristics for a font file in accordance with one embodiment. In the illustrated and described example, the unique set of identifying characteristics comprises a font directory designator 210, a font file name designator 212, and a font file unique identifier 214.

The unique set of identifying characteristics 200 provides an identification mechanism that can be used to identify a font file on a computing device, such as a local computing device, as will become apparent below. This can be helpful when, for example, a document is produced that includes portions that are formatted using a font file that has restrictions that preclude the font file from being embedded in a document or document container. Likewise, this can be helpful when, for example, a computing system executing an application attempts to render or otherwise consume a document or document container which contains one or more text portions that utilize the font file, but the application may not necessarily have access to the font file via the document or the document container.

By using the unique set of identifying characteristics 200 in this and other circumstances, a computing system can attempt to find a font file locally and, as will be described below, in the event the font file is not available locally, still attempt to provide a meaningfull and visually accurate rendering of the document using alternate means.

In the illustrated and described embodiment, font directory designator 210 designates a local font directory in a generally standard way. On a computing system attempting to render or otherwise consume a document or document container, the font directory designator can take the form of any suitable designation such as an actual directory path name to a location where the font file of interest might be stored. More typically, however, the font directory designator may take the form of a designator that is utilized to look up or otherwise substitute the local font directory. For example, the font directory designator in the document might take the form "[FONT-DIR]", and the rendering system might replace this with "c:\windows\fonts". Alternately or additionally, the font directory designator can take the form of a portion or component of a uniform resource identifier (URI), an example of which is provided below.

Font file name designator 212 indicates the name of the font file that was used to format a portion of text. For example, if the text portion of interest was formatted using the Arial font, the font file name designator might be of the form "arial.tff". The font file name designator is configured to be used to attempt to find the specific font file of interest locally so that the associated text portions can be rendered or otherwise consumed.

Even when a local font file on a computing system has the same name as a font file used to format a portion of text, the font file itself may still be a different version of that file, or it may otherwise not be identical to the font file that was originally used. Thus, unique identifier 214 allows a computing system to ascertain whether a local font file with the same name as the font file of interest (as indicated by the font file name designator) is indeed the identical font file.

In the illustrated and described embodiment, unique identifier 214 can comprise any abstraction, description, representation, or other means that can be used to differentiate one font file from another non-identical file. In one embodiment, unique identifier 214 comprises a cyclic redundancy checksum of the font file identified by unique representation 200. Alternately or additionally, the unique identifier can be a hash of the file or any other suitable means of distinguishing the file, as will be appreciated by the skilled artisan.

Figure 3:
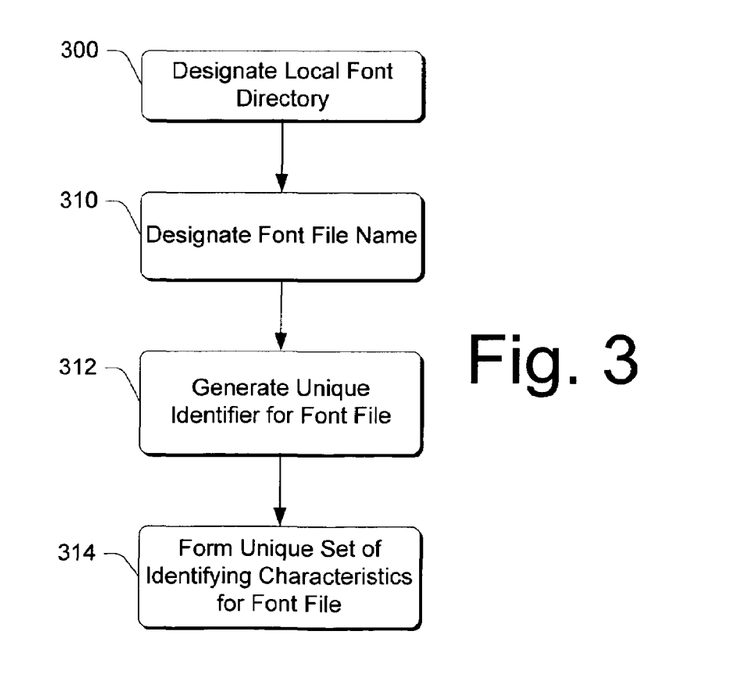
FIG. 3 is a flow diagram that describes steps in a method in accordance with one embodiment.

FIG. 3 is a flow diagram that describes steps for uniquely identifying a font file and providing a unique representation for the font file. The method can be implemented in connection with any suitable hardware, software, firmware or combination thereof. In the illustrated example, the method is implemented in software.

Step 300 designates a local font directory using a font directory designator. Examples of suitable font directory designators are given above. Step 310 designates a font file name by using font file name designator. Examples of how this can be done are provided above. Step 312 generates a unique identifier for the font file. Examples of suitable unique identifiers are given above.

Step 314 forms a unique set of identifying characteristics for the font file by combining the font directory designator, font file name designator and the unique identifier. This step can be implemented in any suitable way. For example, in one exemplary embodiment, the unique set of identifying characteristics takes the form of a uniform resource identifier (URI).

In an embodiment in which the unique set of identifying characteristics comprises a URI, a new URI scheme is defined in which the font file directory designator is the <scheme> component of the URI, the font file name designator is the <path> component of the URI, and the unique identifier is the <query> component of the URI. For example, a URI using "localfont" as the <scheme>, "arial.tff" as the <path> and a cyclic redundancy checksum of the font file equaling "12ad43DF" as the <query> might appear as follows:

"localfont://arial.tff?12ad43DF"

It is to be appreciated and understood that any suitable mechanism for uniquely identifying a font file and for providing a unique set of identifying characteristics for the font file can be utilized without departing from the spirit and scope of the claimed subject matter.

Building an Association

Given that a font file or files of interest can be uniquely identified, as described above, one area in which such uniquely identified font files can be employed, is in the area of document building. Specifically, by using uniquely identified font files, documents or document containers that contain text formatted using such font files can be built and assembled and, in cases in which the font files may be restricted in some manner, visually accurate alternates can be provided for those who consume such documents, as will become apparent below.

Figure 4:
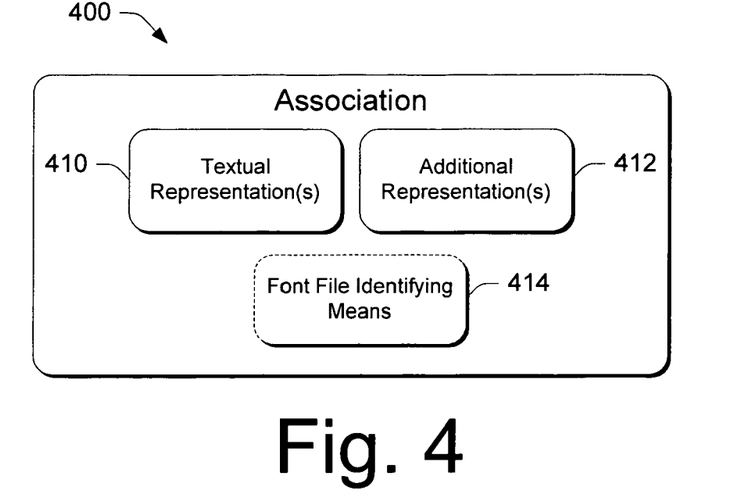
FIG. 4 illustrates an association in accordance with one embodiment.

FIG. 4 illustrates, generally at 400, an association or association structure in accordance with one embodiment. In the illustrated and described embodiment, the association comprises one or more textual representations of text 410, one or more additional representations of text 412, and, optionally, a means 414 for identifying one or more font files associated with one or more of the text portions. The text portions can comprise an entire document and/or lesser portions thereof.

Textual representation 410 comprises, in this example, an entire textual representation that can be rendered into text by using one or more font files that are identical to those that were originally used to format the text. Assume, for example, that the textual representation was rendered using a font file that has a restriction that prevents the font file from being embedded in a document or document container. Regardless, the textual representation contains all of the information and/or data that would be used to render a document in the event the font file were to be embedded in the document or document container. Thus, an assumption with regard to the textual representation is that, even though a restricted font file was used to format the text and this font file cannot otherwise be embedded in the document or document container, the font file may nonetheless be appropriately available at a location where the document is to be rendered or otherwise consumed.

In addition to the textual representation 410, association 400 comprises one or more additional or alternate representations 412 of one or more portions of text contained in the textual representation 410. An additional or alternate representation can comprise any suitable representation such as an image representation of the portion of text, such as a bitmap or jpeg file, or a vector representation of the characters. Here, the additional or alternate representation lose the font character and are no longer treated as chains of individual characters. Rather, the additional or alternate representations are treated as opaque entities. One assumption with regard to the additional or alternate representations is that a font file that was originally used to format portions of a document and which is not embedded in the document or document container, may not necessarily be available at a location where the document is to be rendered or otherwise consumed. Hence, in this case, the additional or alternate representations provide a flexible alternative for providing a visual rendition of the document. Specifically, in the absence of the font file of interest, the additional or alternate representation can be used in place of the textual representation.

In addition to the textual representation 410 and additional representation(s) 412, association 400 may optionally comprise means 414 for identifying one or more font files that were used to format portions of text described by textual representation 410. One example of such a means is described above in connection with FIG. 2. An assumption with regard to the font file identifying means is as follows. In an event that the textual representation was formatted with a font file that is otherwise unavailable from an associated document or document container, the font file may nonetheless be appropriately available at a location in which the document is to be rendered or otherwise consumed. Thus, by providing a mechanism by which an unavailable font file can be identified, a local search can be conducted and, if the font file is found, it can be used in the rendering or consumption process. Otherwise, the alternate or additional representations can be used.

In the event that association 400 does not contain the font file identifying means 414, the font file identifying means may be separately available for use in conjunction with the association. For example, association 400 may contain an identifier, such as a URL, that points to a location from which the font file identifying means can be retrieved. Alternately, in some embodiments, the font file identifying means may not be provided at all. Rather, one or more of the additional representations may be used in place of the textual representation that is associated with a restricted font file.

Figure 5:
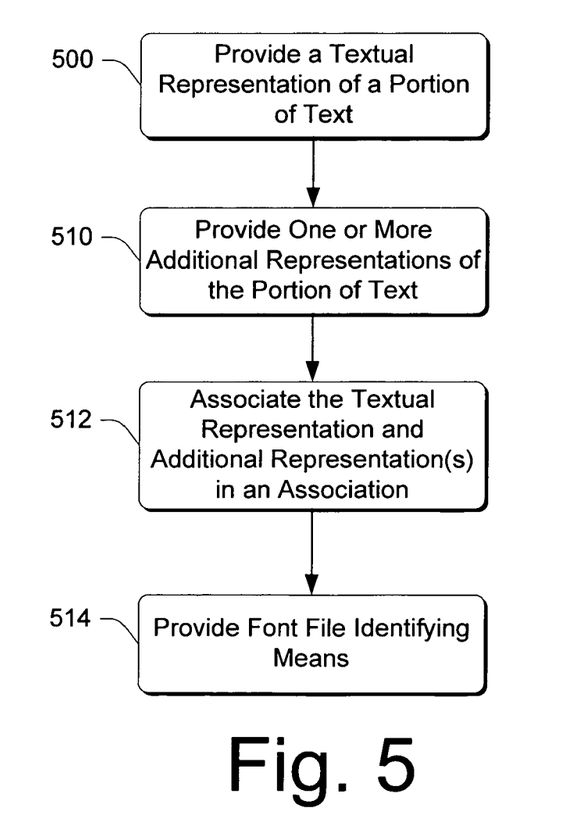
FIG. 5 is a flow diagram that describes steps in a method in accordance with one embodiment.

FIG. 5 is a flow diagram that describes steps in a method for building an association, such as an association described above. The method can be implemented in connection with any suitable hardware, software, firmware or combination thereof. In the illustrated example, the method is implemented in software.

Step 500 provides a textual representation of a portion of text. This step can be performed in any suitable way. In the illustrated and described embodiment, this step can be performed by providing a representation of the text in a manner in which it can be rendered or otherwise consumed using font files that are identical to those that were originally used to prepare the text.

Step 510 provides one or more additional representations of the text portions. Specific examples of additional representations are provided above.

Step 512 associates the textual representation and one or more additional representations in an association. This can be implemented in any suitable way. For example, a textual representation of a portion of text and a bitmap image of that portion can be associated to form an association in the form of a document or document container.

Step 514 provides a means for identifying a font file associated with the portion of text used to provide the textual representation. This step can be implemented in any suitable way. One such font file identifying means is described above in FIG. 2.

Consuming an Association Contained in a Document or Document Container

Having now described how a font file, such as a restricted font file, can be uniquely identified, as well as how an association can be built that contains or at least refers to a uniquely identified font file, the discussion below provides a description of how such an association can be consumed in accordance with one embodiment.

Figure 6:
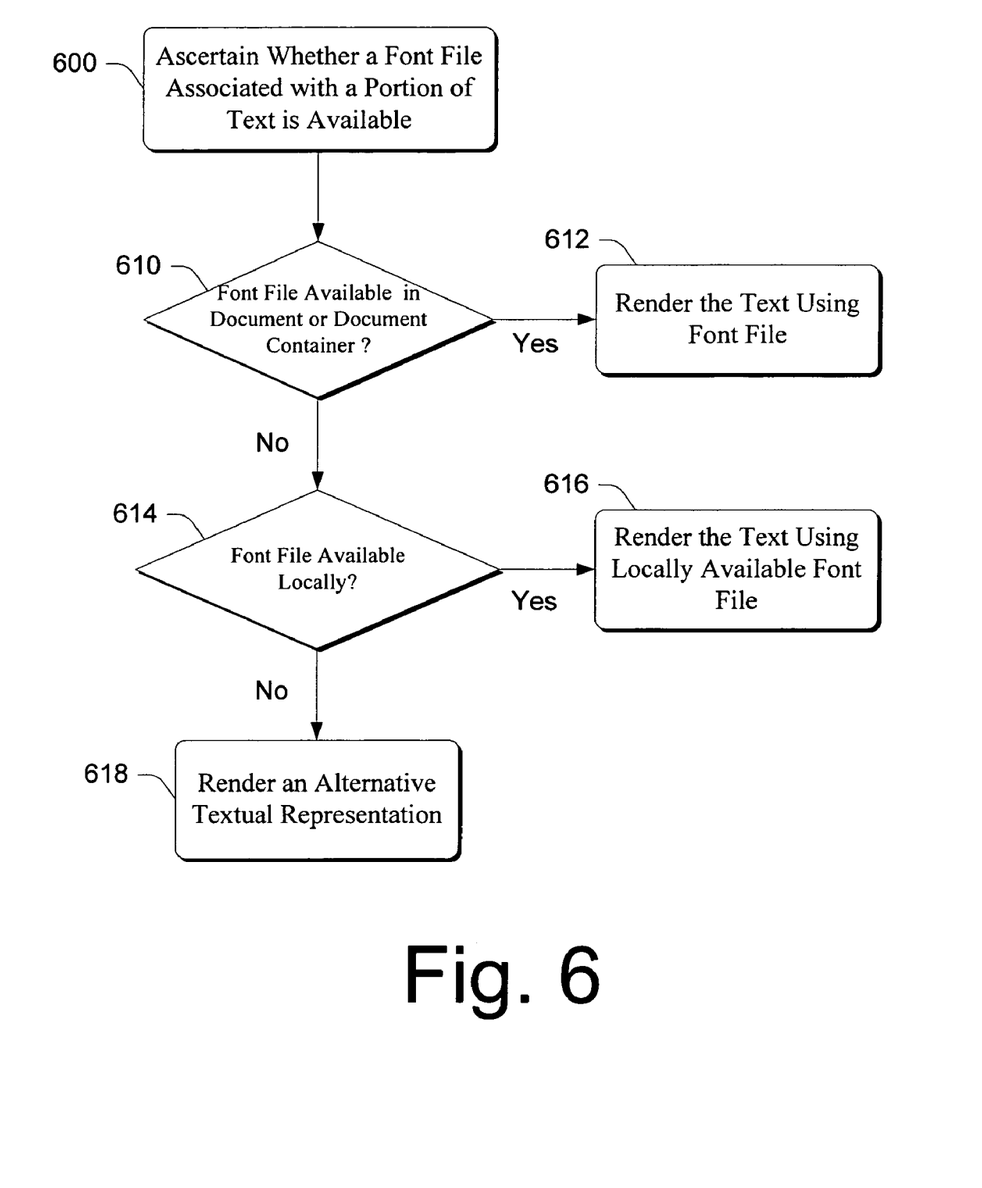
FIG. 6 is a flow diagram that describes steps in a method in accordance with one embodiment.

FIG. 6 is a flow diagram that describes steps in a method for consuming or otherwise rendering a portion of text which was produced using a font file that may have restrictions regarding its use. The method can be implemented in connection with any suitable hardware, software, firmware or combination thereof.

Step 600 ascertains whether a font file associated with a portion of text is available. In one embodiment, an association, such as an association comprising a document or document container, is received by a computing device on which the association is to be consumed.

Step 610 ascertains whether the font file is available in the document or document container (e.g. as by being embedded in the document or otherwise contained within the document container). If the font file is available, step 612 renders the text using the font file. If, on the other hand, the font file is not available, step 614 ascertains whether the font file is available locally on the computing device on which the document is intended to be consumed. One way of performing this step is by using a unique set of identifying characteristics of the font file to search the local device for the associated font file. Examples of unique sets of identifying characteristics are provided above.

If the font file is available locally, step 616 renders the text using the locally-available font file. If, on the other hand, the font file is not locally available, step 618 renders an alternative textual representation. Examples of alternative textual representations are provided above.

Implementation Example

It is to be appreciated and understood that the above-described embodiments can be implemented in any suitable way and within any suitable environment. One specific implementation example is provided below.

In one embodiment, the inventive principles described above can be implemented in connection with Microsoft's Metro document format. The Metro document technology is described in co-pending and commonly assigned U.S. patent application Ser. No. 10/836,327 entitled "Document Mark Up Methods and Systems" filed on May 1, 2004.

Briefly, the Metro document paradigm provides a framework and format that defines a set of building blocks for composing, packaging, distributing, and rendering document-centered content. This technology includes using a logical entity called a package (collection of related parts) to gather all the pieces of a document (or other types of content) into one object. To allow for an accurate rendition of a text portion of a document, a copy of the original font file (or a subset thereof) used to format that portion is embedded within a Metro document. This original font file is identified through a URI that points to a part (i.e. the font file) in a Metro package (collection of all the pieces of a document in one object). In the event that the font file is not embedded in the Metro document, the above-described approach can be utilized to provide workable options for providing an accurate visual rendition of the document.

Specifically, by employing the above-described unique set of identifying characteristics, a computing system can ascertain whether or not a font file that is identical to one that was used to format a portion of text contained in the Metro document, is available locally. If a font file identical to one that was used to format the text portion is not available locally, then one or more additional representations for that portion of text can still be rendered.

In the Metro-specific context, which utilizes a hierarchical, tagged based language called Extensible Application Markup Language (XAML) to describe a document's content, at least two alternative markup representations can be utilized to describe the font file's unique set of identifying characteristics, as well as the alternate or additional representations.

The discussion below assumes at least some familiarity with the Metro format and XAML.

First, an extension of the existing <Glyphs> element can be used to represent text elements by the addition of a property referencing the alternative bitmap image. Accordingly, the extended <Glyphs> element markup can appear as follows:

```
<Glyphs OriginX="10" OriginY="10" UnicodeString="Hello!"
FontURI="localfont://arial.ttf?12ad43DF"
AlternateImage="/images/glyphs1.tif" />
```

Here, the unique set of identifying characteristics appears as the FontURI using the "localfont:" URI scheme. An AlternateImage property is added and references the alternate bitmap representation of the textual portion.

Second, the existing <Glyphs> element can be wrapped in an outer control structure to select between the textual representation and the alternate bitmap image. In this case, the <Glyphs> element is not modified. An example of this approach is shown just below.

```
<AlternateContent>
  <Choice RequiresResource="localfont://arial.ttf?12ad43DF">
    <Glyphs OriginX="10" OriginY="10" UnicodeString="Hello!"
    FontURI="localfont://arial.ttf?12ad43DF">
```

```
        </Choice>
        <Fallback>
            <Image X="10" Y="10" ImageSource="/images/glyphs1.tif"/>
        </Fallback>
    </AlternateContent>
```

Here, the <AlternateContent> construct selects between the <Choice> and <Fallback> elements based on the availability of the external resource identified by the "RequiresResource" attribute of the <Choice> element, i.e. the uniquely represented font file.

In this specific implementation example, a document is produced by examining each text element or portion in a particular document and ascertaining whether it utilizes a non-embeddable font by inspecting the license right bit field in the OS/2 table of the font header, as will be appreciated by the skilled artisan. If the font is freely embeddable, then the font file is embedded in the document package and the part name is incorporated in the text markup in the usual way. If, on the other hand, the font is not freely embeddable, then the "localfont:" URI is created to represent the font file. In addition, markup is emitted and selects between the alternate representation (e.g. the bitmap image) and the textual representation. Further, markup is emitted for the alternate representation of the text element and for the textual representation using the created "localfont:" URI.

On the consumption side, the document markup is parsed and, if a selection between the alternate representation and the textual representation is encountered, the URI specified for the font file is inspected. If it is a "localfont:" URI, then the following occurs. First, a determination is made as to whether the font file identified in the <path> portion of the URI is available on the local system. If it is present, then the CRC-32 of the locally available font file is computed and compared with the CRC-32 contained in the markup. If the CRC-32 matches with the CRC-32 specified in the <query> of the URI, then the locally available font file is used to render the textual representation. If the font file is not present, or the CRC-32 does not match, then the alternate representation is used in the rendering process.

CONCLUSION

The various embodiments described above can enable an accurate visual rendition of a document to be rendered, even though one or more fonts that were originally utilized to format the document may not be available from the document or an associated document container itself. In this manner, text that makes up the document is still discoverable in the document file. This enables such functionality as copying/pasting, accessibility for screen readers, searching and the like. In addition, if an identical font file as was used to format the text is available outside of the document file, the text can be rendered using the original textual representation, potentially at a much higher quality than the alternate representation (e.g. the bitmap image representation).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   identifying a portion of text in a document, wherein the portion of text is associated with a restricted font;
   determining that the restricted font is not embedded in the document;
   in response to determining that the restricted font is not embedded in the document, uniquely identifying a font file associated with the restricted font by:
      designating a font directory using a font directory designator;
      designating a font file name using a font file name designator;
      generating a unique identifier for the font file; and
      combining the font directory designator, the font file name designator, and the unique identifier to provide a unique representation for the font file;
   using the unique representation to:
      identify potentially matching font files, wherein the potentially matching font files are in a local font file directory of the computing system, the directory of the computing system comprising a plurality of different font files;
      for a particular one of the potentially matching font files, create a unique identifier based on the content of the particular one of the potentially matching font files;
      ascertain that the particular one of the potentially matching font files is a font file associated with the restricted font if a comparison of the unique identifier that is created based on the content of the particular one of the potentially matching font files and the unique identifier of the unique representation indicates a match;
   in an event that it is ascertained that the particular one of the potentially matching font files is a font file associated with the restricted font, rendering a textual representation of the portion of text using the font file; and
   in an event that it is ascertained that a font file associated with the restricted font is not available, rendering an alternative representation of the portion of text, wherein the alternative representation is not based on the restricted font.

2. The method of claim 1, wherein the font directory designator designates a local font directory on a computing device.

3. The method of claim 1, wherein the unique identifier for the font file comprises a cyclic redundancy checksum of the associated font file.

4. The method of claim 1, wherein the unique representation comprises a uniform resource identifier (URI).

5. The method of claim 1, wherein the portion of text comprises less than an entirety of a document that can be displayed.

6. The method of claim 1, wherein the alternative representation comprises a bitmap.

7. A method comprising:
   identifying a portion of text in a document, wherein the portion of text is associated with a restricted font;
   determining that the restricted font is not embedded in the document;
   in response to determining that the restricted font is not embedded in the document, ascertaining whether a font file associated with the restricted font is available on a computing system on which the portion of text is intended to be displayed, wherein the ascertaining comprises:

determining a unique representation for a font file associated with the restricted font, wherein the unique representation comprises a font directory designator, a font file name designator, and a unique identifier;

using the unique representation to:
- identify potentially matching font files, wherein the potentially matching font files are in a local font file directory of the computing system, the directory of the computing system comprising a plurality of different font files, each of the font files having a file name indicated by the font file name designator;
- for a particular one of the potentially matching font files, create a unique identifier based on the content of the particular one of the potentially matching font files;
- ascertain that the particular one of the potentially matching font files is a font file associated with the restricted font if a comparison of the unique identifier that is created based on the content of the particular one of the potentially matching font files and the unique identifier of the unique representation indicates a match;

in an event that it is ascertained that the particular one of the potentially matching font files is a font file associated with the restricted font, rendering a textual representation of the portion of text using the font file; and in an event that it is ascertained that a font file associated with the restricted font is not available, rendering an alternative representation of the portion of text, wherein the alternative representation is not based on the restricted font.

8. The method of claim 7, wherein said portion of text comprises less than an entirety of the document.

9. The method of claim 7, wherein said portion of text comprises part of a document package that utilizes a hierarchical, tagged-based language to describe the document's content.

10. The method of claim 7, wherein said unique representation comprises a uniform resource identifier (URI).

* * * * *